E. NEUHOLD.
AUTOMATIC TELEPHONE EXCHANGE.
APPLICATION FILED APR. 2, 1910.
1,033,725. Patented July 23, 1912.
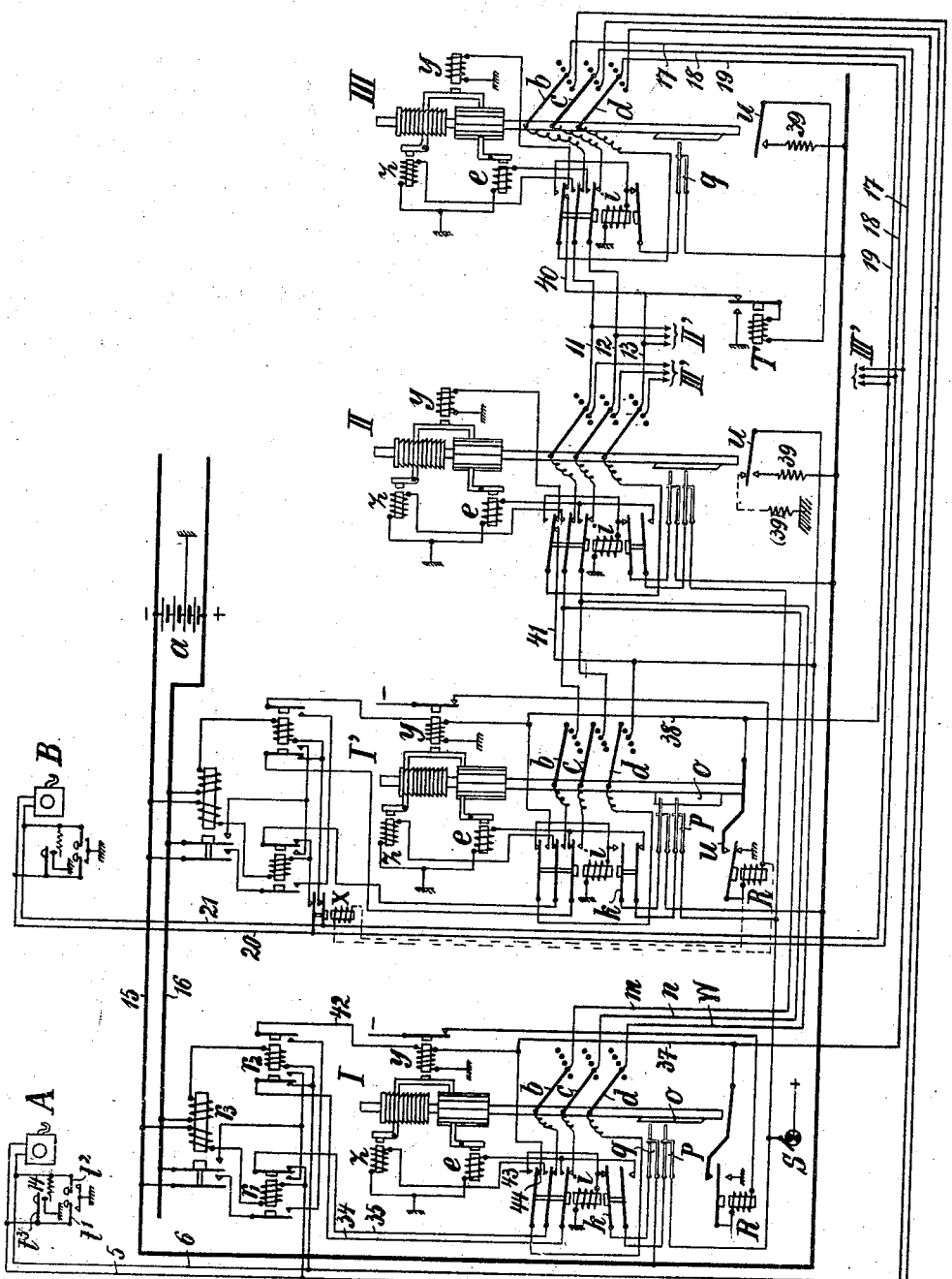

UNITED STATES PATENT OFFICE.

ERWIN NEUHOLD, OF FRIEDENAU, NEAR BERLIN, GERMANY, ASSIGNOR TO THE FIRM OF DEUTSCHE TELEPHONWERKE G. M. B. H., OF BERLIN, GERMANY.

AUTOMATIC TELEPHONE-EXCHANGE.

1,033,725. Specification of Letters Patent. Patented July 23, 1912.

Application filed April 2, 1910. Serial No. 553,075.

*To all whom it may concern:*

Be it known that I, ERWIN NEUHOLD, engineer, a subject of the King of Hungary, and resident of Friedenau, near Berlin, Germany, have invented certain new and useful Improvements in Automatic Telephone-Exchanges, of which the following is a specification.

This invention relates to an automatic telephone exchange in which speaking connections between two subscribers are established and maintained through a series of selectors brought into connection in succession, and particularly relates to the devices serving for disconnection and restoration of the mechanisms after the conclusion of a conversation.

According to the invention a common release conductor for all the release magnets is formed from the separate testing lines of the series of selectors used through which each successive selector is indicated in the known manner as free or busy upon the contact set of the previous selector. This is effected by causing a resistance of suitable magnitude to be inserted between the point at which the testing voltage is available for all the testing lines of the exchange (pole of the battery) and each separate testing line, such insertion occurring—according to the system of busy test employed, i. e., whether the busy test is the absence or presence of a working potential—either in the first case upon the connection of the separate testing lines in the common conductor, or in the other case upon the re-division of the common conductor into its parts. During the conversation the release magnets are either in the known manner all branched in parallel with each other from a common conductor or are in series with this conductor.

The combination of the release conductor from its parts according to the invention is for example effected at each selector by its testing magnet, which responding in the known manner when the next free selector is found, brings the testing conductor of the latter into connection with the corresponding testing conductor leading from the first named selector to the preceding selector, and with its own releasing magnet, in such a way that when the testing magnet of another seeking selector is joined to the conductor, this magnet is put into a branch with the release magnets already connected and with the auxiliary resistance connected, which branch—according to the testing system—is supplied with, or deprived of sufficient current from the testing magnet. This is attained in substance by a suitable choice of the ohmic value of the auxiliary resistance relatively to that of the release magnets on the one hand, and that of the testing magnets on the other hand. Ordinary (unpolarized) testing and release magnets or relays can be used without the testing condition of the connected or separate testing lines being altered in any unsuitable way by the release magnets included and without the release magnets being influenced at an inappropriate time. Both of these conditions are important since otherwise double connections and premature releases would occur.

Upon the conclusion of a conversation the release conductor receives current from a suitable source of potential through a relay or system of relays actuated by one or both subscribers, by which means the selectors being restored to their position of rest the release conductor is divided into its separate parts. According to the invention the release conductor is suitably made dependent upon a relay or system of relays which is always accessible to the calling subscriber,—i. e., without the intervention of contacts closed in the selector—and, for example if so-called preselectors are not provided, is permanently connected with the subscriber's line. This prevents the relay system being removed from the subscriber's influence by failure of the contacts, and the series of selectors remaining wholly or partially incapable of release, and further enables the release to be effected at any time independently of the particular adjustment or time of running of the selector. By suitable arrangement of this relay system, moreover, which as the only one present transmits all operations of the subscriber to the selector, it is possible by means of a simple connection to the testing line to so modify the circuits that not only the calling but also the called subscriber, and each independently of the other, can release the speaking connection.

The invention will be explained in greater detail with reference to the accompanying drawing. This latter shows diagrammatically an exchange constructed according to the well known Strowger system (see *Elektrotechnische Zeitschrift* 1903, page 727), i. e., the selectors each provided with a contact arm carrier which can be raised and turned, are divided into three groups which coöperating allow connections to be made between any two subscribers in a total number of say ten thousand subscribers, and of some one thousand such connections being made simultaneously. Of the first group (first group selectors)—which contains ten thousand selectors each associated with a subscriber—there are illustrated two selectors I and I'; of the second group (second group selectors)—which includes say three thousand selectors—there is illustrated one selector II; of the third group (line selector)—also with three thousand selectors each having 100 subscriber connections—one selector III is illustrated. The selector III is connected to the contact sets of the selector II and other selectors II' of this second group by conductors 11, 12, 13, while the other selectors III' of the third group are connected to other contacts of the selector II. In the same way the selectors II, II' and so forth are joined to the contact sets of the selector I. The connection of a subscriber A who is joined to his appropriate selector I through conductors 5, 6 to a subscriber B who is joined through conductors 20, 21, or 17, 18 to three corresponding contacts of the selectors III and III', is effected either over the selectors I—II—III or I—II—III' or I—II'—III and so forth; the selectors II—II' or III—III' being sought out in the known way automatically so that each selector is only used for one speaking connection at a time. The selector III to which the desired subscriber B along with 99 other subscribers is connected is adjusted by the calling subscriber A with the aid of the magnets $z$ and $e$ of this selector to those contacts to which the lines 17, 18 of the desired subscriber are joined.

The process of connecting in detail is as follows: Suppose the number of the desired subscriber B is 5345. The subscriber A first presses key $t^1$ five times by which means a five-fold current impulse passes from the battery $a$ over conductor 15, the left hand winding of a differential relay $r^3$, relay $r^1$, conductor 5, key $t^1$ and earth. The relays $r^3$ and $r^1$ attract their armatures and cause current to flow from the battery $a$ over conductor 16, the right hand armatures of $r^3$ and $r^1$, conductor 35, the middle armature of the relay $i$ which at first is not yet excited, the back contact of this armature, and the lifting magnet $z$ of the selector I to earth, which current results in five successive excitations of $z$ and a lifting of the switch shaft of I five steps. Then the key $t^2$ is pressed once by which means current passes from battery $a$ over conductor 16, the right hand winding of relay $r^3$, relay $r^2$, conductor 6, key $t^2$ and earth; and the turning magnet $e$ is excited once through the relays $r^2, r^3$ over the left hand armature of $r^2$ conductor 34, and an armature of $i$. Through this excitation of the turning magnet $e$ the contact arms $b, c, d$ of the selector I come upon the first contacts of the fifth contact series. These contacts may be joined to a selector already occupied by another selector of the first group. The contact arms, therefore, move on to the next contacts which are connected over the conductors $m, n, w$ to the selector II of the second group. This moving on of the contact arm is caused in the known manner by the establishment of a connection at the beginning of the turning movement of the switch shaft between two springs $p$ through the movement of a projection $o$ secured upon the shaft, this projection serving to hold the springs $p$ apart when the switch shaft is in its position of rest. In consequence of this contact at $p$ the circuit of the battery $a$ is completed over an automatic interrupter S, the as yet unattracted armature $k$ of the relay $i$ and the turning magnet $e$. Consequently the turning magnet $e$ is excited and moves on the arms $b, c, d$ one step as often as the device $s$ makes or breaks the circuit. If in this manner the arms $b, c, d$ reach the contacts of conductors $m, n, w$ and, if the selector II is not occupied with any other conversation, i. e. is in its position of rest, a current flows from the battery $a$ over the contact $u$ of the selector II which is still closed, conductor $w$, arm $d$ of I, the uppermost armature of relay $i$, its bank contact 43, the winding of relay $i$ and earth back to battery $a$. The relay $i$ attracts all its armatures and (1) separates the turning magnet $e$ from the interrupter S by raising the lowermost of the two armatures $k$ from its contact so that the magnet has no current and the arms $b, c, d$ remain stationary; (2) separates the lifting and turning magnets $z$ and $e$ from the relay system $r^1, r^2, r^3$, i. e., from the conductors 34, 35; (3) connects the conductors 5, 6 (speaking lines) over two of the upper armatures of relay $i$ to the contact arms $b, c$, and thus to the conductors $m, n$, and the magnets $e, z$ of the second group selector II, the relay $i$ of which is as yet unexcited. At the same time the winding of relay $i$ of I is connected through its armature $k$ to a spring contact $q$—actuated like the contact $p$—and over this contact to the battery $a$, so that the relay $i$ remains excited so long as the selector I is set, that is during the period of the conversation.

The subscriber A now presses the key $t^1$ three times and the key $t^2$ once, whereupon—as described in connection with I,—the lifting magnet $z$ of II is excited three times and the turning magnet $e$ of II once. So long as the arms $b$, $c$, $d$ of selector II come upon the contacts of conductors already occupied, the selector is moved forward step by step in consequence of the action of contact $p$—as previously described in connection with I—and finally as the result of the operation of relay $i$ the arms $b$, $c$, $d$ are brought upon the contacts of conductors 11, 12, 13 which lead to an unoccupied selector III, the contact $u$ of which is still closed. In the present case two steps are necessary for this. At the same time the conductors $m$, $n$ are disconnected from the magnets $e$, $z$ of selector II and joined over conductor 11, 12, to the magnets $e$, $z$ of the selector III which has been found unoccupied. Further when the switch shaft was raised the contact $u$ of II was opened so that the testing line $w$ belonging to selector II was deprived of current and this selector became indicated on the contacts of selectors I as busy. Finally a relay T has been excited which simultaneously with excitation of the relay $i$ of II deprives the testing line of selector III of current in order to prevent this selector being brought into use by another party even before it has begun to move. (Such a relay could also be used for the selector II). The subscriber A now presses the key $t^1$ four times and key $t^2$ five times. By this means the lifting magnet $z$ of III is excited four times and the turning magnet $a$ five times, so that the arms $b$, $c$, $d$ of selector III are moved on to the contacts of conductors 17, 18, 19 of subscriber B or No. 5345. On the lifting of the switch shaft the contact $u$ of III is broken and so the selector III is henceforth indicated as busy upon the contact sets of the remaining selectors II, whereupon the hitherto excited relay T is deprived of current. If the subscriber B is not already occupied with another conversation the selector I' belonging to the subscriber B is in the position of rest and consequently the conductor 19 is connected with battery $a$ over the contact $u$ of I', the armature and winding of the relay R, and the resting armature of the relay magnet $y$ of I'. As a result the relay $i$ of III is excited, whereupon (1) conductors 11, 12, are connected with the contact arms $b$, $c$, of III and over these with the conductors 17, 18 or the subscriber's station B, (2) the magnets $e$, $z$ of III are disconnected from the conductors 11, 12, and (3) the winding of the relay $i$ of III is put permanently in circuit over the contact $q$ of III. At the same time the relay R of selector I' is excited and disconnects itself from the conductor 19, connecting itself into a retaining current circuit extending over the armature of the corresponding release magnet $y$. Through the conductor 19 being thus deprived of current the subscriber B is indicated as busy on the other selectors III. The subscriber A can now call up the subscriber B over the conductors 5, 6—$m$, $n$—11, 12—17, 18 for example by setting in action a bell connected at the latter station between conductors 17, 18 or 20, 21, by means of a correspondingly connected magneto generator at station A. The speaking currents between the two stations run over the same set of conductors. The subscribers' microphones are supplied from battery $a$, over the relay system $r^1$, $r^2$, $r^3$ of the selector I. For this purpose the microphones may be considered as connected in known manner in parallel to the receivers between the conductors 5, 6, or 20, 21. The microphone supply currents are too weak to cause any excitation of the relays $r^1$, $r^2$ even if they are sufficiently strong for their purpose. In the same way the armature of relay $r^3$ is not attracted because the two windings of $r^3$ are equally strongly excited. During the process of connection described, the result of which is illustrated in the drawing—the release magnets $y$ of selectors I, II, III have according to the invention, been connected in parallel, by means of the working contacts 44 on the uppermost armature of relay $i$ and connections 40 and 41 of the same, to a conductor extending over the testing arm $d$, which is made up of the separate testing lines $w$, 13, 19. This conductor can be supplied with current over a connection 42—connections 37 and 38 will be explained later—through the relay system $r^1$, $r^2$, $r^3$ of the calling subscriber, so that all the relays $y$ respond at the same time and release the selectors which then, for example in the known manner partly by means of springs and partly under the action of their weight, return to the position of rest. As a result (1) the contacts $p$, $q$ are opened; (2) the relays $i$ are deprived of current; (3) their respective armatures return to the position of rest, and (4) the contacts $u$ are closed with the exception of the contact $u$ of I' which is only closed (by depriving the relay R of current) when the subscriber B also hangs up his receiver presses down his key $t^3$ and so excites his release magnet $y$. In this way the system is brought back to the position of rest and the selectors II, III are free for further connections.

When the release is to be effected the subscriber A after hanging up his receiver presses down his key $t^3$ and so earths both conductors 5, 6 simultaneously, the first (5) directly; the other (6) over resistance 14. Consequently both of the windings of relay $r^3$ of selector I are excited but not equally, and simultaneously the relays $r^1$ and $r^2$ are excited so that all the relays attract their armatures. Current therefore flows from the battery $a$, over conductor 15, outer armature of $r^3$, the two outer armatures of $r^1$ and $r^2$ and the parallel connected release magnets $y$ to earth. In order that this method of release may be made possible without disturbance of the other functions of the testing line, the resistances 39 are according to the invention arranged upon the contacts $u$; and in the example of construction chosen for illustration in which the potential of the testing line when busy is *nil* so that the busy test is operated by the absence of the working potential, the arrangement is such that when a selector is appropriated and set in action, the resistance 39 is disconnected from the testing line, while when the selector is in the position of rest, it lies between this conductor and the negative pole of the battery which gives the working potential. At the instant when for example, the testing arm $d$ of selector II touches the testing line 13 of the free selector III, the relay $i$ of II responds and a current consequently flows from the negative pole of the battery over resistance 39 and contact $u$ of the selector III, conductors 13, $w$, and in parallel over the already closed release magnets $y$ of selectors II and I to earth. The ohmic value of 39 is so chosen in proportion to that of the magnets $y$ that this current is too weak to excite the release magnets $y$. Thus no premature release occurs. In an analogous manner the resistance 39 of II can be so chosen that the current flowing over this resistance in the magnet $y$ of selector I when the free selector II is found, is too weak to excite the magnet. The resistances 39 of all the selectors can be equal so as always to fulfil this condition. Further according to the invention the ohmic resistance of 39 bears a definite ratio to the resistance of the testing magnets $i$, namely such that if during the establishment of a speaking connection the contact arm of a selector, which is active in another speaking connection, comes upon the contact of the conductor $w$, 13, between which and earth all the release magnets are connected, current is so far withdrawn from the testing magnet $i$ of that selector which is parallel to these releasing magnets by the effect of resistance 39 inserted in the testing circuit, that that testing magnet does not respond and the other selector goes on to find a free conductor. In this way it is impossible for a double connection to be established.

The excitation of the release magnets is effected as described by the application of the full potential of the battery through the relays $r'$, $r^2$, $r^3$ of the calling subscriber, and over the connection 42 to the conductor $w$—13. If at this instant the contact arm $d$ of another selector should come for example upon the conductor $w$, no disarrangement results since the release of the selector II is not hindered by this, but the selector is immediately available and may therefore be connected to the calling selector.

If the connection 38 (and correspondingly 37) is provided the contact $u$ of the selector I' can be brought into the position of rest by the subscriber A, by the release magnet $y$ of the selector I' being excited simultaneously with the other release magnets over conductor 38. In this arrangement it is possible to disconnect the bridge of relays $r^1$, $r^2$, $r^3$ at the selector I' of the desired subscriber, by means of a relay $x$ excited simultaneously with the relay R, so that the whole speaking connection 5, 6—34, 35—$m$, $n$, 11, 12—17, 18—20, 21, only contains a single bridge namely that of the relays $r^1$, $r^2$, $r^3$ at selector I with the supply battery $a$, while otherwise two such bridges are present. The disconnection by the relay $x$ is also advantageous in so far as by its means the relays $r^1$, $r^2$ of I' are withdrawn from the influence of the calling current sent to the subscriber B, so that a false operation of the selector I' is impossible. The connection 38, 37, has the further advantage that the called subscriber B can also release the speaking connection independently of the calling subscriber A, but otherwise in the same manner as the latter. The relay $x$ may obviously not be present, the relay system $r^1$, $r^2$, $r^3$ of the subscriber B remaining in connection with him. This release from both ends makes it more certain that the selectors will be released since each release magnet can receive current from the two sides.

The switching in of the release conductor could naturally be effected from any other relay system, for example from one first brought into action during the establishment of the speaking connection, but the use of the relay placed immediately adjacent to the subscribers' terminals, as described, has certain advantages which have already been referred to. It is to be noted that the automatic disconnection of the resistances (or relays) R is not absolutely necessary for there is nothing to prevent the release conductor being connected through a resistance of suitable dimensions with the releasing potential during the conversation, a connection which, as described, comes into existence momentarily at every connection of one of the selectors II, III.

In a system in which a selector is indicated as unoccupied, for example, by a *nil* potential, and as busy by some higher potential, as is the case in the original Strowger system, the resistances 39 are so arranged, as is indicated at the selector II, that after the selector has been brought into use its testing line ($w$) is connected over the auxiliary resistance (39) to for example the earthing point of the battery $a$. The testing magnet $i$ must then be joined to the positive or negative pole of the battery and must work in the opposite way, i. e., so that—as is the case in the Strowger system—the selector moves on so long as it is excited and comes to a standstill when current ceases to flow through it. In this case during the subscribers' conversation not only the release magnets y but also the resistance 39 are inserted and the conductors w—13 are connected to earth. Thus a premature release during the establishment of connections is prevented. On the other hand the testing magnet i of another calling selector, if it comes upon the conductor w—13, always receives sufficient current to respond over the parallel release magnets, care being taken through a suitable dimensioning of the resistance 39, that the component currents flowing through the separate release magnets, is not sufficient to excite these. The release takes place again through the application of the full battery potential.

I claim—

1. An automatic telephone exchange system, comprising a source of current, a plurality of electromagnetically operated selectors, a relay system and conductors to convey current from said source to the selector magnets, a testing relay associated with each selector, forming part of a testing circuit and adapted to connect a selector with the next free selector, a release magnet for each selector, connections between said release magnets and said separate testing circuits whereby the release magnets may be branched parallel from a common circuit formed by the separate testing circuits, and a resistance included in each separate testing circuit which is of such value that current passing through the testing circuit will not operate the release magnet connected therewith.

2. An automatic telephone exchange system, comprising a source of current, a plurality of electromagnetically operated selectors, a relay system and conductors to convey current from said source to the selector magnets, a testing relay associated with each selector, forming part of a testing circuit and adapted to connect a selector with the next free selector, a release magnet for each selector, connections between said release magnets and said testing circuits, whereby the release magnets may be branched parallel from a common circuit formed by the connected separate testing circuits, a resistance included in each separate testing circuit which is of such value that current passing through the testing circuit will not operate the release magnets connected therewith, a conductor connecting the testing circuit with contacts of the said relay system, and electrical connections for simultaneously operating the connected release magnets.

3. An automatic telephone exchange system, comprising a source of current, a plurality of electromagnetically operated selectors, a relay system and conductors to convey current from said source to the selector magnets, a relay associated with each selector forming part of a testing circuit and adapted to connect a selector with the next free selector, a release magnet for each selector, connections between said release magnets and said testing circuits whereby the release magnets may be branched parallel from a common circuit formed by the connected separate testing circuits, a resistance included in each separate testing circuit which is of such value that current passing through the testing circuit will not operate the release magnets connected therewith, and means enabling either the one subscriber or both subscribers to operate simultaneously all of the connected release magnets.

4. An automatic telephone exchange system, comprising a source of current, a plurality of electromagnetically operated selectors, a relay system and conductors to convey current from said source to the selector magnets, a testing line adapted to be connected with each selector, a testing relay associated with each selector to establish connection between the testing line of a seeking selector and the testing line of the selector found, a release magnet for each selector, means for establishing connection between the testing line of the seeking selector and its corresponding release magnet, a resistance included in each separate testing circuit which is of such value that current passing through the testing circuit will not operate the release magnet connected therewith, connections between each release magnet and said testing circuit whereby a common release conductor for all of the release magnets is formed, and means enabling either one or both subscribers, each independently of the other, to operate simultaneously all of the connected release magnets.

5. An automatic telephone exchange system, comprising a source of current, a plurality of electromagnetically operated selectors, a relay system and conductors to convey current from said source to the selector magnets, a testing line adapted to be connected with each selector, a testing relay associated with each selector to establish connection between the testing line of a seeking selector and the testing line of the selector found, a release magnet for each selector, means for establishing connection between the testing line of the seeking selector and its corresponding release magnet, means for disconnecting the testing magnet of the seeking selector from the testing line of the selector found, and a resistance included in each separate testing circuit which is of such value that current passing through the testing circuit will not operate the release magnet connected therewith.

6. An automatic telephone exchange system, comprising a source of current, a plurality of electromagnetically operated selectors, a relay system and conductors to convey current from said source to the selector magnets, a testing line adapted to be connected with each selector, a testing relay system associated with each selector to establish connection between the testing line of a seeking selector and the testing line of the selector found, a release magnet for each selector, means for establishing connection between the testing line of the seeking selector and its corresponding release magnet, means for disconnecting the testing magnet of the seeking selector from the testing line of the selector found, and means for throwing into the testing circuits resistances so dimensioned with reference to the testing magnets that interference with the operation of another seeking selector is avoided.

7. An automatic telephone exchange system, comprising a source of current, a plurality of electromagnetically operated selectors, a relay system and conductors to convey current from said source to the selector magnets, a testing line adapted to be connected with each selector, a testing relay associated with each selector to establish connection between the testing line of a seeking selector and the testing line of the selector found, a release magnet for each selector, means for establishing connection between the testing line of the seeking selector and its corresponding release magnet, means for disconnecting the testing magnet of the seeking selector from the testing line of the selector found, means for throwing into the testing circuits resistances so dimensioned with reference to the testing magnets and release magnets that on the one hand interference with the operation of another seeking selector is avoided, and on the other hand the excitation of the release magnets is prevented.

8. An automatic telephone exchange system, comprising a source of current, a plurality of electromagnetically operated selectors, a relay system and conductors to convey current from said source to the selector magnets, a relay associated with each selector and forming part of a testing circuit, a release magnet for each selector, connections between said release magnets and the parts of said testing circuit whereby the release magnets may be branched in parallel from a common circuit, and a relay associated with each selector which is so connected as to become excited simultaneously with the excitation of the relay magnet of the preceding or seeking selector and to deprive the testing line of its corresponding selector of current in order to prevent this selector being brought into use by another party before it has begun its movement.

9. An automatic telephone exchange system, comprising a source of current, a plurality of electromagnetically operated selectors, a relay system and conductors to convey current from said source to the selector magnets, a relay associated with each selector and conductors to establish a testing circuit, a release magnet for each selector, connections between said release magnets and the parts of said testing circuit whereby the release magnets may be branched in parallel from a common circuit, a resistance included in each separate testing circuit which is of such value that current passing through the testing circuit will not operate the release magnet connected therewith, connections between each release magnet and said testing circuit whereby a common release conductor for all of the release magnets is formed, and a relay associated with each selector which is so connected as to become excited simultaneously with the excitation of the relay magnet of the preceding or seeking selector and to deprive the testing line of its corresponding selector of current in order to prevent this selector being brought into use by another party before it has begun its movement.

10. An automatic telephone exchange system, comprising a source of current, a plurality of electromagnetically operated selectors, a relay system and conductors to convey current from said source to the selector magnets, a relay associated with each selector and conductors to establish a testing circuit, a release magnet for each selector, connections between said release magnets and said testing circuit whereby the release magnets may be branched in parallel from a common circuit, a resistance included in each separate testing circuit which is of such value that current passing through the testing circuit will not operate the release magnet connected therewith, connections between each release magnet and said testing circuit whereby a common release conductor for all of the release magnets is formed, means enabling either the calling subscriber or the called subscriber and each independently of the other to operate simultaneously all of the release magnets, a conductor connected with said release magnets over said relay system, electrical connections for simultaneously operating all of the release magnets, and a relay associated with each selector which is so connected as to become excited simultaneously with the excitation of the relay magnet of the preceding or seeking selector and to deprive the testing line of its corresponding selector of current in order to prevent this selector being brought into use by another party before it has begun its movement.

11. An automatic telephone exchange system, comprising a source of current, a plurality of electromagnetically operated selectors, a relay system and conductors to convey current from said source to the selector magnets, a testing line adapted to be connected with each selector, a testing relay associated with each selector to establish connection between the testing line of a seeking selector and the testing line of the selector found, a release magnet for each selector, means for establishing connection between the testing line of the seeking selector and its corresponding release magnet, and a relay associated with each selector which is so connected as to become excited simultaneously with the excitation of the relay magnet of the preceding or seeking selector and to deprive the testing line of its corresponding selector of current in order to prevent this selector being brought into use by another party before it has begun its movement.

In testimony whereof, I have hereunto affixed my signature this 16th day of March 1910, in the presence of two witnesses.

ERWIN NEUHOLD

Witnesses:
 HENRY HASPER,
 WOLDEMAR HAUPT.

Copies of this patent may be obtained for five cents each, by addressing the "Commissioner of Patents, Washington, D. C."